(12) United States Patent
Shiraishi (10) Patent No.: US 9,208,358 B2
(45) Date of Patent: Dec. 8, 2015

(54) ELECTRONIC PAPER, COPY CONTROLLING PROGRAM AND COPY CONTROLLING METHOD

(71) Applicant: Jun Shiraishi, Hachioji (JP)

(72) Inventor: Jun Shiraishi, Hachioji (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 307 days.

(21) Appl. No.: 13/654,445

(22) Filed: Oct. 18, 2012

(65) Prior Publication Data

US 2013/0106808 A1     May 2, 2013

(30) Foreign Application Priority Data

Nov. 2, 2011    (JP) ................................. 2011-240854

(51) Int. Cl.
     *G09G 3/34*           (2006.01)
     *G06F 21/84*          (2013.01)
     *G06F 1/16*           (2006.01)
     *G09G 5/00*           (2006.01)

(52) U.S. Cl.
CPC .............. *G06F 21/84* (2013.01); *G06F 1/1694* (2013.01); *G09G 5/003* (2013.01); *G09G 3/344* (2013.01); *G09G 2310/0245* (2013.01); *G09G 2358/00* (2013.01); *G09G 2360/144* (2013.01); *G09G 2380/14* (2013.01)

(58) Field of Classification Search
CPC ....................................................... G09G 3/344
USPC ......................................................... 345/107
See application file for complete search history.

(56) References Cited

U.S. PATENT DOCUMENTS

| | | | |
|---|---|---|---|
| 7,627,907 B2 * | 12/2009 | Sawada et al. ................ | 345/212 |
| 2005/0212761 A1 | 9/2005 | Sawada et al. | |
| 2006/0242556 A1 * | 10/2006 | Koshimizu et al. ........... | 715/507 |
| 2006/0259773 A1 * | 11/2006 | Jung et al. ..................... | 713/176 |

(Continued)

FOREIGN PATENT DOCUMENTS

| | | | | |
|---|---|---|---|---|
| JP | 2005-266226 A | | 9/2005 | |
| JP | 2005267170 A | * | 9/2005 | .............. G06F 3/033 |

(Continued)

OTHER PUBLICATIONS

Office Action (Notice of Reasons for Refusal) issued on Oct. 22, 2013, by the Japanese Patent Office in corresponding Japanese Patent Application No. 2011-240854, and an English Translation of the Office Action. (10 pages).

*Primary Examiner* — Adam J Snyder (74) *Attorney, Agent, or Firm* — Buchanan Ingersoll & Rooney PC (57) ABSTRACT

Disclosed is an electronic paper, which makes it possible to suppress inappropriate operations for copying images displayed and retained on the electronic paper. The electronic paper includes: a gyro sensor and a pressure sensor; a status detecting section to determine whether or not the electronic paper currently enters into a specific status; a counting section to count a number of times the electronic paper enters into the specific status and a display controlling section to make an image display section display a document image thereon. When the status detecting section determines that the electronic paper currently enters in the specific status, and the counting section determines that the number of times the electronic paper has entered into the specific status, is equal to or lower than the predetermined number of times, the display controlling section adds specific information, indicating that the document image is a copy, to the document image.

15 Claims, 6 Drawing Sheets

FIG. 1 IMAGINARY FIGURE

(56) References Cited

U.S. PATENT DOCUMENTS

2009/0231252 A1* 9/2009 Maegawa .................. 345/87
2011/0216376 A1* 9/2011 Rutman ..................... 345/76

FOREIGN PATENT DOCUMENTS

| | | | | |
|---|---|---|---|---|
| JP | 2006-39107 A | 2/2006 | | |
| JP | 2007-079871 A | 3/2007 | | |
| JP | 2007-088854 A | 4/2007 | | |
| JP | 2009-244345 A | 10/2009 | | |
| JP | 2010175929 A * | 8/2010 | ............... | G09G 5/00 |
| JP | 2010-217720 A | 9/2010 | | |
| JP | 2010217720 A * | 9/2010 | ............... | G09G 5/00 |
| WO | 2005/057538 A1 | 6/2005 | | |

* cited by examiner

ELECTRONIC PAPER, COPY CONTROLLING PROGRAM AND COPY CONTROLLING METHOD

This application is based on Japanese Patent Application No. 2011-240854 filed on Nov. 2, 2011, with the Japan Patent Office, the entire content of which is hereby incorporated by reference.

BACKGROUND OF THE INVENTION

The present invention relates to an electronic paper, a copy controlling program and a copy controlling method, and specifically relates to an electronic paper that displays an image onto an image display section having an image retaining property, a copy controlling program to be executed in the electronic paper concerned and a copy controlling method for controlling an operation for copying the image currently displayed on the electronic paper concerned.

In recent years, various kinds of displaying apparatuses, such as an electronic paper, etc., have been increasingly proliferated in the market. For instance, instead of outputting printed paper sheets serving as conference materials or the like, an Electrophoretic Display, which serves as an electronic paper abovementioned, has been employed for displaying the images of the conference materials or the like, thereon, so as to promote the reduction of the resource consumption. In the Electrophoretic Display abovementioned, by applying a voltage to charged particles dispersed in a transparent liquid agent or charged particles encapsulated into microcapsules and by making them migrate electrophoretically, the displayed image can be retained without any power source (without applying a voltage, or without making an electric current flow therethrough).

With respect to the technology in regard to the electronic paper abovementioned, for instance, Tokkai 2006-039107 (Japanese Patent Application Laid-Open Publication) sets forth such a portable-type display storage medium that is provided with: a display section to display and retain a document image thereon in a state of no power source; a status detecting section to detect various kinds of current statuses of the display storage medium concerned, including a status in which the concerned display storage medium is directed to a front side or a rear side, another status in which the concerned display storage medium is covered, still another status in which the concerned display storage medium is made to stand up, and yet another status of whether or not the user resides within a predetermined distance from the display storage medium concerned; a determining section to determine whether or not the current status, detected by the status detecting section, is in conformity with a predetermined status established in advance; and an erasing section to erase the document image currently displayed and retained on the display section, when the determining section determines that the current status is in conformity with the predetermined status established in advance.

Further, with respect to the other technology in regard to the electronic paper abovementioned, for instance, Tokkai 2005-266226 (Japanese Patent Application Laid-Open Publication) sets forth such a flexible and thin-type electronic paper that is provided with: a display section to display and retain an information image thereon in a state of no power source; a status detecting section to detect various kinds of status changes of the electronic paper concerned, including a rotational displacement of the concerned electronic paper, a relocation of the concerned electronic paper to a predetermined place and an overlapping status of plural electronic papers; and a control section to apply a predetermined processing such as a processing for switching an information image to be displayed and retained onto the display section from one to another, another processing for erasing electronic data, representing the information image to be displayed and retained onto the display section, from a storage section, in response to the detected result above-mentioned.

Since a conventional display apparatus, such as an LCD (Liquid Crystal Display), etc., displays an image on its screen in such a manner that an image display section itself emits light to form the image on the screen, it is impossible for a copier to accurately copy or scan the image displayed on the screen of the display apparatus concerned. On the other hand, since another image display section provided in the electronic paper (such as the Electrophoretic Display or the like), serving as a particle-migration type display apparatus, does not emit light to form an image on its screen, it becomes possible for the copier to accurately copy or scan the image displayed on the screen of the electronic paper concerned. Accordingly, there has arisen such a fear that image information currently displayed and retained on the image display section of the electronic paper would be leaked by conducting an operation for copying or scanning the image concerned.

In addition to the above, when an image is formed by copying an image currently displayed on the image display section of the electronic paper, it is impossible for a third party to discriminate whether or not the concerned image is created by copying the image originally displayed on the electronic paper such as the Electrophoretic Display or the like. Owing to such the drawback as abovementioned, when managing copy information, it has been necessary for the user to manage the copy information in such a mode that the user can discriminate the copy information representing the copied image from other information, resulting in an increase of the user's burden.

Conventionally, when the operation for copying or scanning the image currently displayed on the image display section of the electronic paper is freely allowed, the above-mentioned problem has arisen. To solve such the problem as abovementioned, the image display section has been controlled to erase the image currently displayed thereon, every time when the electronic paper enters into a specific status. However, since, sometimes, it has been necessary to allow the user to conduct the operation for copying or scanning the image currently displayed on the image display section of the electronic paper, (for instance, at the time when the appropriate or authorized user intends to use the copied image, etc.), there has also arisen such the problem that the conventional countermeasure, in which the images are erased without exception, has impaired the usability of the electronic paper concerned.

SUMMARY OF THE INVENTION

To overcome the abovementioned drawbacks in conventional image forming apparatus, it is one of objects of the present invention to provide an electronic paper, a copy controlling program and a copy controlling method, each of which makes it possible to suppress inappropriate or unauthorized operations for copying images displayed and retained on the electronic paper concerned.

Accordingly, at least one of the objects of the present invention can be attained by the electronic papers, the copy controlling program and the copy controlling method, described as follows.

(1) According to an electronic paper reflecting an aspect of the present invention, the electronic paper that is provided with an image display section having an image retaining property, comprises: a sensor to detect a status of the electronic paper; a status detecting section to determine whether or not the electronic paper currently enters into such a specific status that allows a user to perform a copying operation or a scanning operation on the image display section, based on an output signal outputted by the sensor; a counting section to count a number of times the electronic paper enters into the specific status, in order to determine whether or not the number of times exceeds a predetermined number of times established in advance; and a display controlling section to make the image display section display a document image thereon; wherein, when the status detecting section determines that the electronic paper currently enters in the specific status, and when the counting section determines that the number of times the electronic paper has entered into the specific status, is equal to or lower than the predetermined number of times established in advance, the display controlling section adds specific information, clearly indicating that the document image concerned is a copy, to the document image.

(2) According to another aspect of the present invention, in the electronic paper recited in item 1, when the status detecting section determines that the electronic paper currently enters in the specific status, and when the counting section determines that the number of times the electronic paper has entered into the specific status, exceeds the predetermined number of times established in advance, the display controlling section erases the document image currently displayed on the image display section.

(3) According to still another aspect of the present invention, in the electronic paper recited in item 1, at least one of setting items, including a kind of the document image serving as an object to which the specific information is added, a string of characters to be employed as the specific information, an arrangement of the specific information, a display contrast of the specific information, and the predetermined number of times, is settable as an adding condition by the user; and the display controlling section adds the specific information to the document image, according to the adding condition established by the user.

(4) According to still another aspect of the present invention, in the electronic paper recited in any one of items 1-3, a gyro sensor and a pressure sensitive sensor, each serving as the sensor, are disposed at positions located on a displaying surface side of the electronic paper; and the specific status represents such a state that the image display section of the electronic paper is directed downwards and the displaying surface side is pressed onto a certain object.

(5) According to still another aspect of the present invention, in the electronic paper recited in any one of items 1-3, a gyro sensor and a plurality of pressure sensitive sensors, each serving as the sensor, are disposed at positions located on a displaying surface side of the electronic paper; and the specific status represents such a state that the image display section of the electronic paper is directed upwards and a certain object is pressed onto the displaying surface side in such a manner that the pressure sensitive sensors are sequentially pressed one by one in a long side direction or a short side direction of the image display section.

(6) According to a computer readable storage medium reflecting still another aspect of the present invention, the computer readable storage medium stores a computer executable program to be executed in a display apparatus that is provided with an image display section having an image retaining property, the program being executable by a computer to cause the computer to perform a process comprising: making the image display section display a document image thereon; determining whether or not the display apparatus currently enters into such a specific status that allows a user to perform a copying operation or a scanning operation on the image display section, based on an output signal outputted by a sensor disposed in advance; counting a number of times the display apparatus enters into the specific status, so as to determine whether or not the number of times exceeds a predetermined number of times established in advance; and adding specific information, clearly indicating that the document image concerned is a copy, to the document image currently displayed on the image display section, when it is determined that the display apparatus currently enters in the specific status, and when it is determined that the number of times the display apparatus has entered into the specific status, is equal to or lower than the predetermined number of times.

(7) According to a copy controlling method reflecting yet another aspect of the present invention, the copy controlling method, employing an electronic paper that is provided with an image display section having an image retaining property, comprises: making the image display section display a document image thereon; determining whether or not the electronic paper currently enters into such a specific status that allows a user to perform a copying operation or a scanning operation on the image display section, based on an output signal outputted by a sensor disposed in advance; counting a number of times the electronic paper enters into the specific status, so as to determine whether or not the number of times exceeds a predetermined number of times established in advance; and adding specific information, clearly indicating that the document image concerned is a copy, to the document image currently displayed on the image display section, when it is determined that the electronic paper currently enters in the specific status, and when it is determined that the number of times the electronic paper has entered into the specific status, is equal to or lower than the predetermined number of times.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1a shows an overall block diagram indicating a configuration of an electronic paper embodied in the present invention, while

DETAILED DESCRIPTION OF THE PREFERRED EMBODIMENT

As described in the background of the invention, since the image display section provided in the electronic paper such as the Electrophoretic Display or the like, serving as the particle-migration type display apparatus, does not emit light to form an image, it is possible for any user to accurately copy or scan the image currently displayed on the screen, and accordingly, there exists such the fear that the information included in the image would be leaked to a certain unauthorized user. In addition, when an image is formed by copying an image currently displayed on the image display section of the electronic paper, it is impossible for the third party to discriminate whether or not the concerned image is created by copying the image originally displayed on the electronic paper, resulting in increase of the user's burden for controlling the information. Although, in order to solve such the problem as above-mentioned, it is applicable that the image display section is controlled to erase the image currently displayed thereon every time when the electronic paper enters into a specific status, the countermeasure in which the images are erased without exception, impairs the usability of the display apparatus concerned, since even the appropriate or authorized user also cannot use the images concerned.

On the other hand, a special paper sheet, on which a copy checking woven pattern (or a copy guard woven pattern) is printed in advance, is employed for creating an important document, such as a cash voucher, a seal registration certificate, etc. The copy checking woven pattern, abovementioned, is defined as such a woven pattern that is constituted by a part of woven pattern, which is erased (or disappears) after copying it onto a paper sheet, and another part of woven pattern, which can be reproduced (or appears) after copying it onto the paper sheet, so as to make, for instance, characters of "Copy" emerge on the copied paper sheet, even if the original woven pattern merely appears as a fine geometric pattern at a first glance. By employing such the special paper sheet as abovementioned, it is possible to check the unauthorized or illegal copy operation. However, there has been no electronic paper that displays the document image superimposed with the copy checking woven pattern or the like.

To overcome the abovementioned drawbacks of the conventional electronic paper, an embodiment of the present invention is so constituted that, when the electronic paper enters into a specific status, the currently performed operation is determined as a copying or scanning operation, and, until a number of copying operations exceeds a predetermined number established in advance, the concerned copying or scanning operation is allowed to repeat under a condition that specific information, clearly representing the fact that the document image currently displayed and retained onto the image display section is a copy, is added to the document image concerned, and then, when the number of copying operations exceeds the predetermined number, the document image currently displayed and retained onto the image display section is erased so as to ban the copying or scanning operation.

Concretely speaking, the electronic paper such as the Electrophoretic Display or the like, serving as a particle migration type display device, is provided with: a status detecting section to detect a current status of the electronic paper; a counting section to count the number of copying operations; and a display controlling section to modify the image currently displayed and retained onto the image display section. When the status detecting section detects such a status that the electronic paper is placed onto a certain object in a state that the image display section thereof is directed downward, the counting section determines whether or not the number of copying operations exceeds the predetermined number established in advance. When the counting section determines that the number of copying operations does not exceed the predetermined number, the display controlling section adds the specific information, clearly representing the fact that the document image currently displayed and retained onto the image display section is a copy, to the document image concerned, while, when the counting section determines that the number of copying operations exceeds the predetermined number, the display controlling section erases the document image currently displayed and retained onto the image display section. Further, the electronic paper, embodied in the present invention, is so constituted that, on an occasion of modifying the document image, determinations of whether or not an image modification processing is applied to every document and what kind of image modification processing is to be applied, are settable beforehand, and, in addition, a contrast intensity is also settable so as to make it possible to adjust a degree of visibility of the specific information.

By modifying the image on the basis of the current status of the electronic paper and the number of copies as abovementioned, it becomes possible for the user to appropriately utilize the image currently displayed and retained onto the image display section, while suppressing the leakage of the image concerned, resulting in a drastic improvement of the user's usability for the electronic paper.

<Embodiment>

Figure 1A:
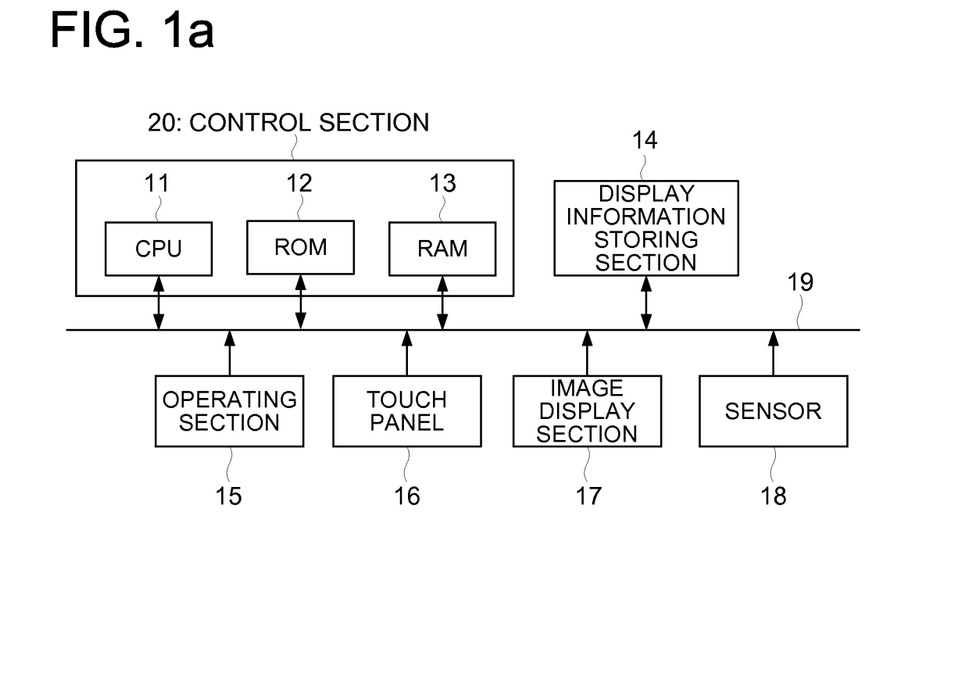
Figure 1B:
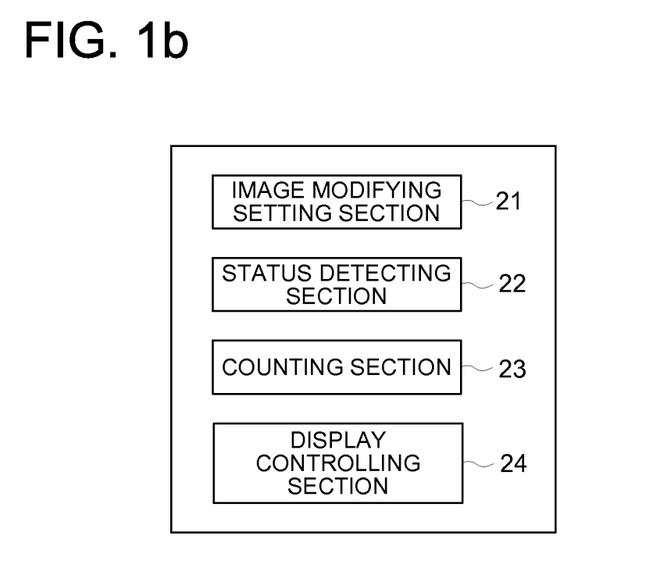
FIG. 1b shows a block diagram indicating a control section of the electronic paper.
Figure 2:
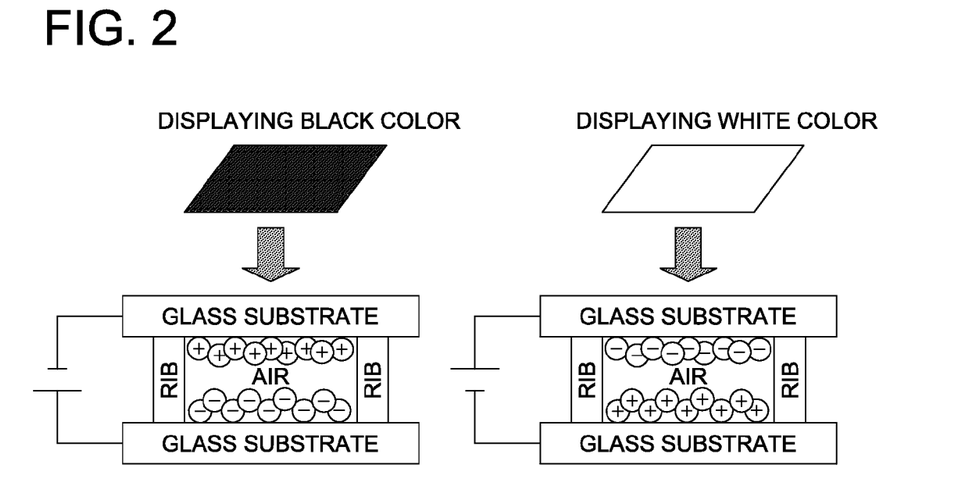
FIG. 2 shows schematic diagrams indicating a panel structural configuration of an electronic paper embodied in the present invention.
Figure 3:
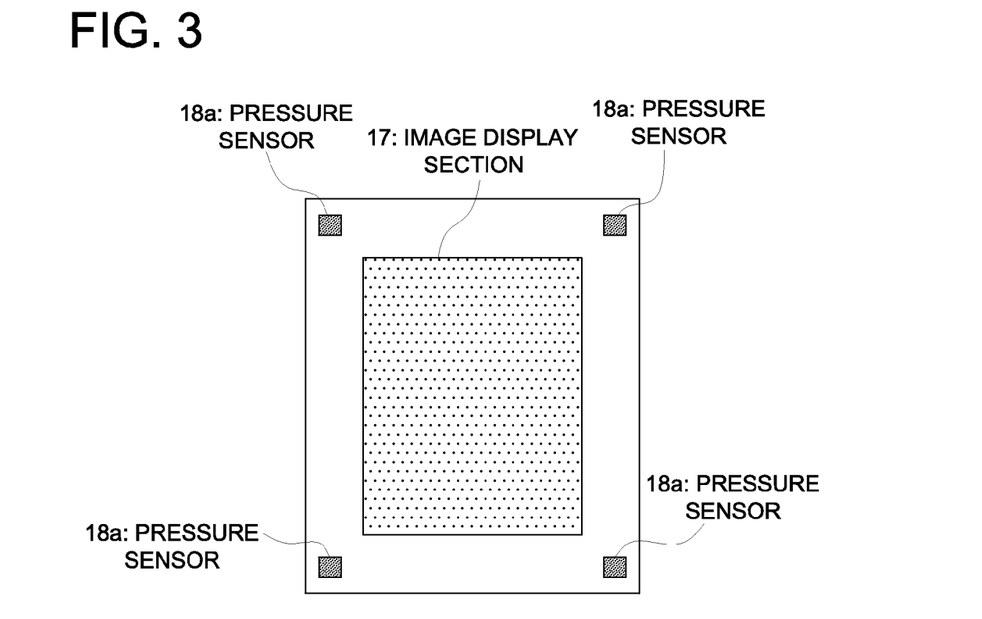
FIG. 3 shows a schematic diagram indicating an arrangement of pressure sensors.
Figure 4:
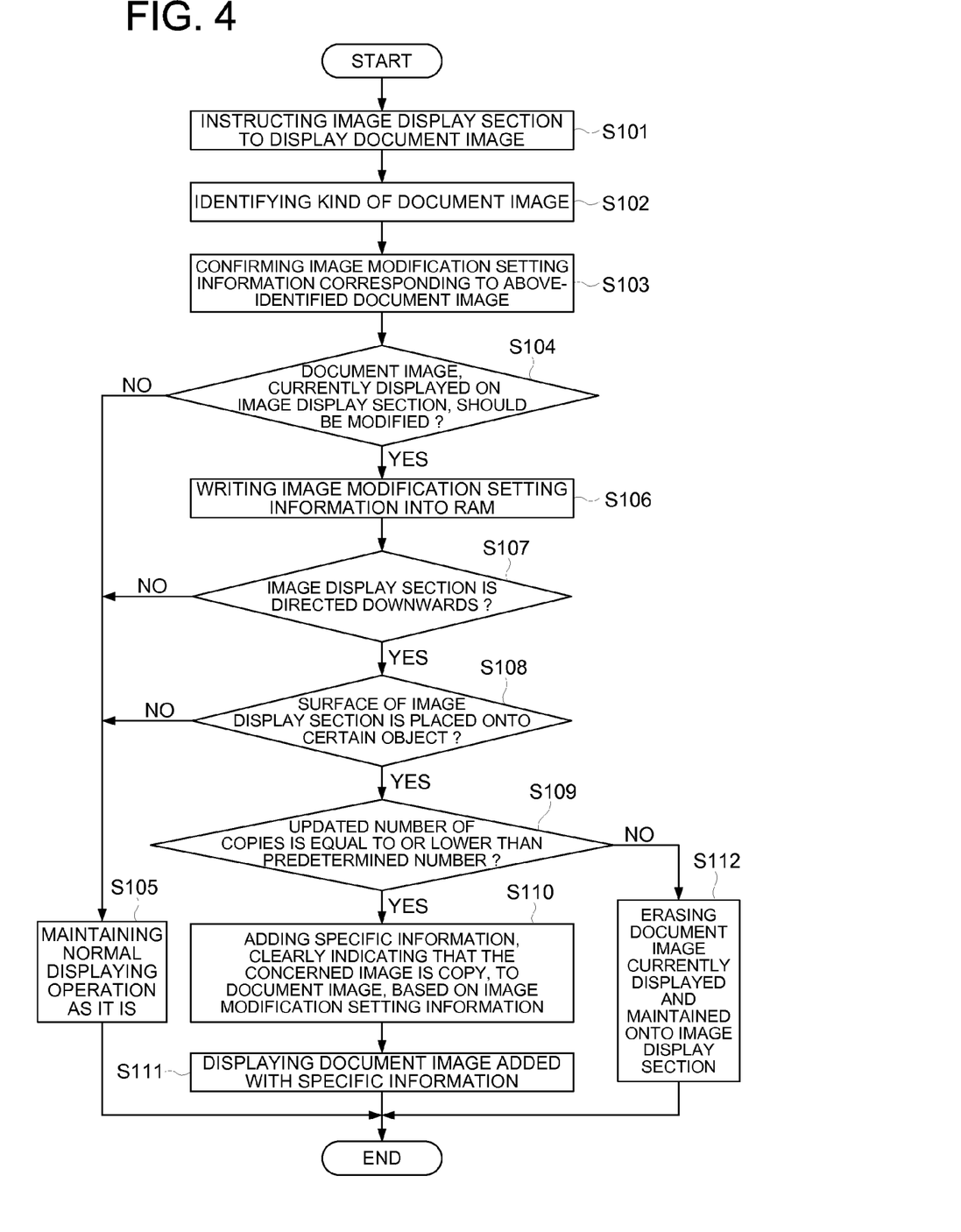
FIG. 4 shows a flowchart indicating a flow of operations to be conducted in an electronic paper embodied in the present invention.
Figure 5:
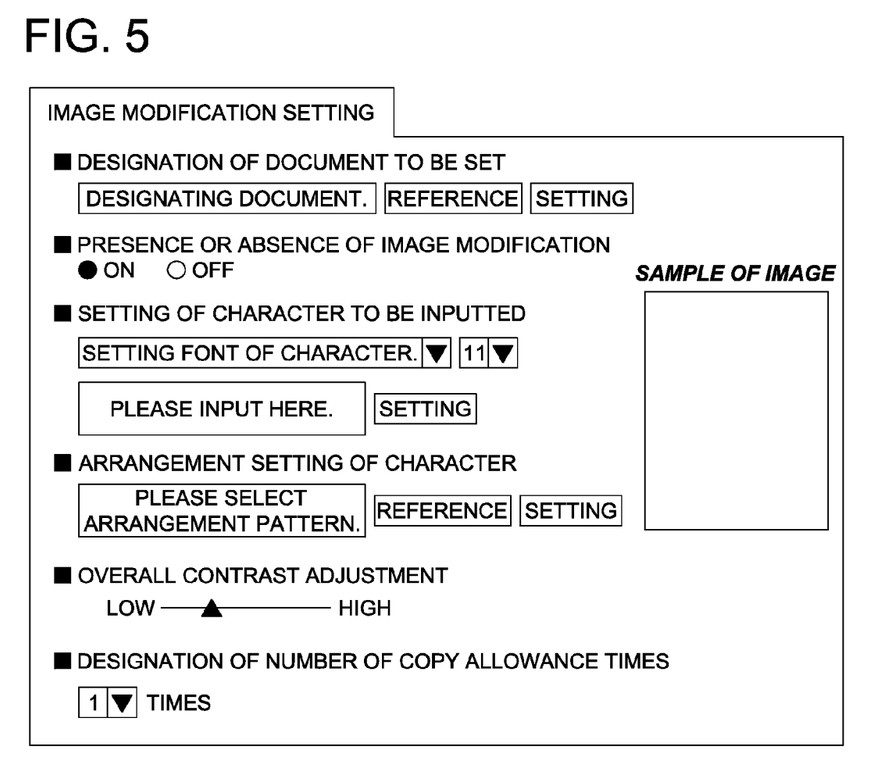
FIG. 5 shows a schematic diagram indicating an exemplary image modifying setting screen embodied in the present invention.
Figure 6:
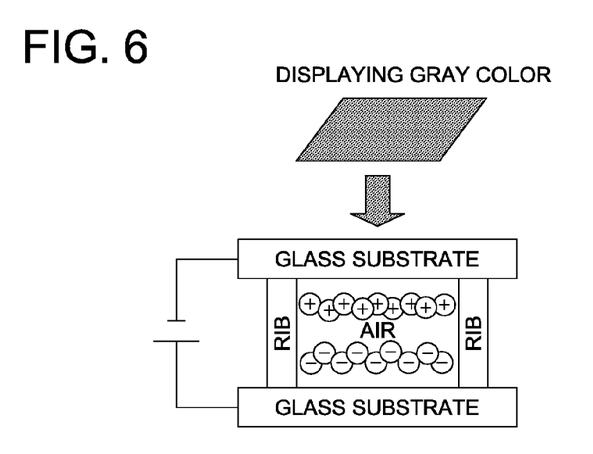
FIG. 6 shows an explanatory schematic diagram for explaining a contrast when an image is modified.
Figure 7:
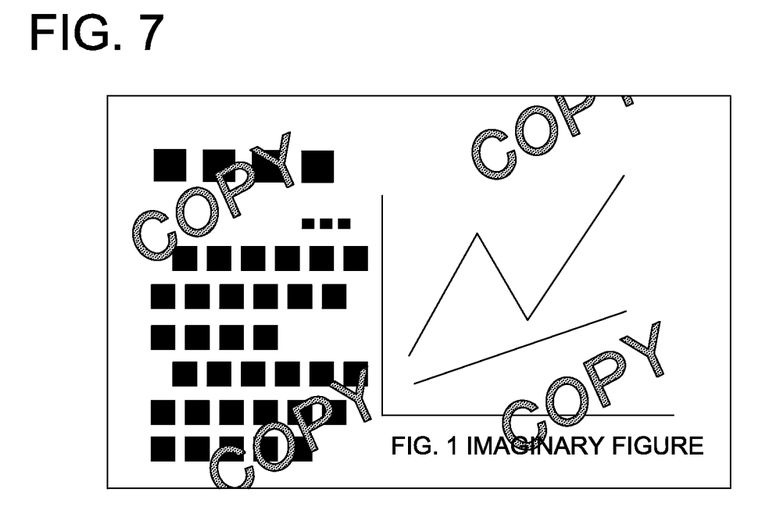
FIG. 7 shows an exemplary schematic diagram indicating a synthesized image after modified by employing an electronic paper embodied in the present invention.
Figure 8:
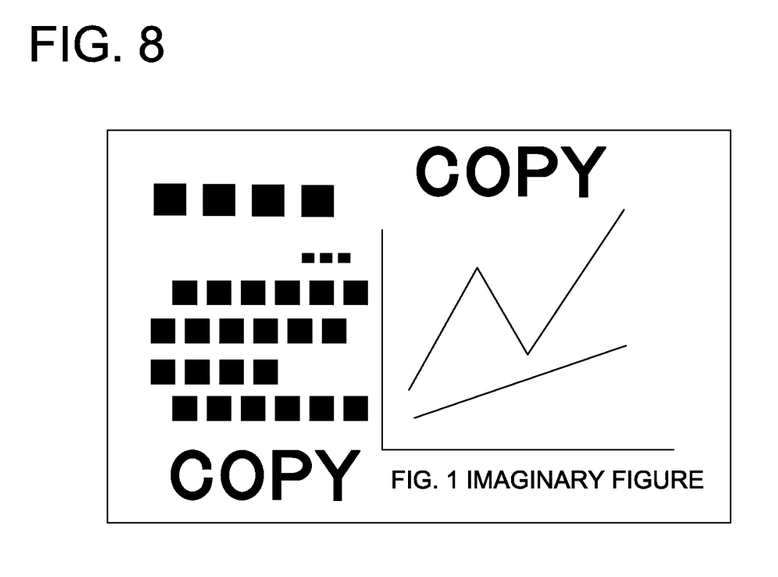
FIG. 8 shows an exemplary schematic diagram indicating another synthesized image after modified by employing an electronic paper embodied in the present invention.
Figure 9:
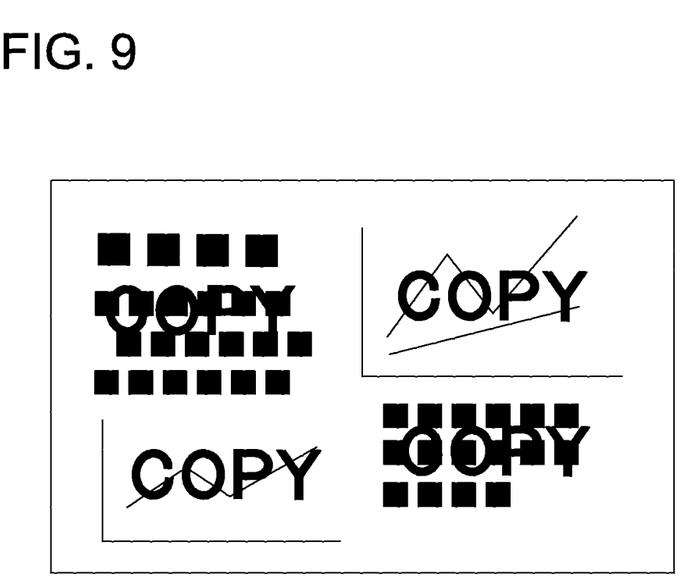
FIG. 9 shows an exemplary schematic diagram indicating still another synthesized image after modified by employing an electronic paper embodied in the present invention

In order to further describe the preferred embodiment of the present invention in detail, referring to FIG. 1 through FIG. 9, an Electrophoretic Display serving as an electronic paper, a copy controlling program and a copy controlling method, embodied in the present invention, will be detailed in the following. FIG. 1a shows an overall block diagram indicating a configuration of an electronic paper embodied in the present invention, while FIG. 1b shows a block diagram indicating a control section of the electronic paper. Further, FIG. 2 shows schematic diagrams indicating a panel structural configuration of the electronic paper embodied in the present invention, while FIG. 3 shows a schematic diagram indicating an arrangement of pressure sensors. Still further, FIG. 4 shows a flowchart indicating a flow of operations to be conducted in the electronic paper embodied in the present invention, and FIG. 5 shows a schematic diagram indicating an example of image modifying settings for every document Still further, FIG. 6 shows an explanatory schematic diagram for explaining a contrast at the time of modifying an image. Yet further, FIG. 7 through FIG. 9 show exemplary schematic diagrams indicating various kinds of modified images.

An electronic paper 10, embodied in the present invention, is such a display apparatus that is provided with a function of displaying and retaining an image without requiring any power source (in other words, that has an image retaining property), and, as shown in FIG. 1a, is constituted by a CPU (Central Processing Unit) 11, a display information storing section 14, an operating section 15, a touch panel 16, an image display section 17, a sensor 18, etc., which are coupled to each other through a system bus 19.

The CPU 11 serves as a central data processing unit that performs various kinds of arithmetic calculating operations according to a program currently executed. A ROM (Read Only Memory) 12 stores various kinds of programs, etc., to control overall operations of the electronic paper 10. A RAM (Random Access Memory) 13 stores data, which is necessary for the CPU 11 to implement various kinds of controlling operations, and other data to be temporally stored during the implementation of the controlling operations. Further, the CPU 11 and the storage devices, including the ROM 12, the RAM 13, etc., constitute a control section 20.

In the present embodiment, as shown in FIG. 1b, the control section 20 also serves as an image modifying setting section 21, a status detecting section 22, a counting section 23, a display controlling section 24, etc.

The image modifying setting section 21 makes the image display section 17 display an image modifying screen, detailed later, so as to make it possible for the user to established image modifying conditions for every document. In this connection, although the present embodiment is so constituted that the image modifying screen is displayed onto the electronic paper 10, it is also applicable that the system is so constituted that the image modifying screen is displayed onto a display screen of another apparatus, serving as a sender apparatus from which the concerned document is to be downloaded, such as a printer driver screen of the user's computer, an operating screen provided in an MFP (Multi-Functional Peripheral), etc.

Based on signals outputted by the sensors 18 (including a gyro sensor and a pressure sensor), the status detecting section 22 determines whether or not the electronic paper 10 currently enters into a specific status in which the image display section 17 is directed substantially downward, and is put onto a certain object, namely, whether or not the electronic paper 10 is in such a state that a copying or scanning operation can be implemented thereon.

The counting section 23 compares a number of times the electronic paper 10 enters into the specific status (in other words, a number of times the copying or scanning operation has been actually implemented) with a predetermined number of times established in advance, to determine whether or not the number of times, entering into the specific status, exceeds the predetermined number of times.

The display controlling section 24 identifies a kind of document image, currently displayed and retained onto the image display section 17, based on header information or the like of the document concerned, and acquires image modifying information, which has been established in regard to the kind of the concerned document image by the image modifying setting section 21. Successively, when the image modifying information represents such a setting that no modification is applied to the document image, the image display section 17 displays and retains the concerned document image onto the image display section 17 as it is, while, when the image modifying information represents such a setting that a modification is applied to the document image, the image display section 17 modifies the document image based on the determination results outputted by the status detecting section 22 and the counting section 23. For instance, when the status detecting section 22 determines that the electronic paper 10 currently enters into the specific status, and when the counting section 23 determines that the number of times the electronic paper 10 enters into the specific status, has not exceeded the predetermined number of times, the display controlling section 24 implements such an image processing for adding specific information, clearly representing that the concerned image is a copy (for instance, a copy checking woven pattern), to the document image currently displayed and retained onto the image display section 17, according to the image modifying information acquired. Further, when the status detecting section 22 determines that the electronic paper 10 currently enters into the specific status, and when the counting section 23 determines that the number of times the electronic paper 10 enters into the specific status, has exceeded the predetermined number of times, the display controlling section 24 implements such another image processing for erasing the document image currently displayed and retained onto the image display section 17.

The display information storing section 14 is constituted by various kinds of storage devices, such as a memory device, an SSD (Solid State Drive), an HDD (Hard Disc Drive), etc., so as to store image data representing the document image serving as a display object, other image data representing the specific information to be added to the document image, etc., therein.

The operating section 15 includes a button, a switch, etc., which are disposed onto the housing body of the electronic paper 10, so as to accept inputting operations performed by the user, and outputs signals corresponding to the user's operations to the CPU 11.

The touch panel 16 serves as a pressure sensitive inputting device or an electrostatic inputting device, in which transparent electrodes are arranged in a lattice pattern and, which is mounted over the image display section 17. When detecting an action for contacting the image display section 17, the touch panel 16 outputs a signal, corresponding to the contacting action concerned, to CPU 11.

The image display section 17 is such a display device that displays information thereon in such a manner that a voltage is applied to charged particles dispersed in a transparent liquid agent or charged particles encapsulated into microcapsules so as to make them migrate electrophoretically. The image display section 17 displays images instructed by the CPU 11, such as a document image, a synthesized image formed by superimposing specific information over a document image, etc.

Referring to the schematic diagram shown in FIG. 2, the panel structure of the image display section 17 will be detailed in the following. A small room, partitioned by walls, each called a rib, is set up for every pixel within a gap formed between two glass substrates constituting the panel concerned. In the small room, positively-charged electronic particles and negatively-charged electronic particles, which repel each other at the time of being electrically charged, are encapsulated. Further, a transparent electrode is provided onto an inner surface of each of the two glass substrates. Accordingly, for instance, by applying a voltage across the upper and lower transparent electrodes, the positively-charged electronic particles are moved upward while the negatively-charged electronic particles are moved downward, so as to respectively adhere onto the upper and lower inner surfaces of the two glass substrates. When colors of the positively-charged electronic particles and negatively-charged electronic particles are respectively established as black and white or the like, it becomes possible to display an image, such as a character, a figure, etc. Since the electronic particles, adhered onto the inner surfaces of the two glass substrates, do not migrate even if the power source that currently applies the voltage across the two glass substrates is turned OFF, it becomes possible to retain the image, such as a character, a figure, etc., currently displayed.

The sensor 18 is one of various kinds of sensors to detect the statuses of the electronic paper 10, and outputs a detected signal to the CPU 11.

For instance, a gyro sensor (or an acceleration sensor), serving as the sensor 18, is mounted onto a place located at an arbitral position of the electronic paper 10, so as to detect an angular velocity of the electronic paper 10. Further, the gyro sensor performs integration arithmetic calculation processing at the ON state so as to calculate an angular, and notifies the status detecting section 22, provided in the control section 20, of the angular calculated. Based on the angular information received from the gyro sensor, the status detecting section 22 determines whether or not the image display section 17 is currently directed downwards (not necessary fully directed downwards).

Further, as shown in FIG. 3, a single or a plurality of pressure sensor/sensors 18a, each serving as the sensor 18, are arranged onto the frame area of the surface on which the image display section 17 is also mounted, and is/are designed so as to be turned ON by the self-weight of the electronic paper 10. Then, each of the pressure sensors 18a notifies the status detecting section 22 of a signal representing ON or OFF status thereof. Based on the signals received from the pressure sensors 18a (for instance, such a factor whether or not a number of ON statuses exceeds a specific number), the status detecting section 22 determines whether or not the electronic paper 10 is currently placed onto a certain object (for instance, a glass plate onto which a document is to be placed).

As abovementioned, by combining the gyro sensor with the pressure sensors, it becomes possible to detect such a state that the image display section 17 of the electronic paper 10 is directed downwards and the electronic paper 10 is placed onto a certain object. Accordingly, by detecting such the state, it becomes possible to determine whether or not an operation for copying or scanning the image, currently displayed on the electronic paper 10, is about to be implemented.

Further, by arranging a plurality of pressure sensors 18a in an appropriate order, it also becomes possible to determine that the image, currently displayed on the image display section 17 of the electronic paper 10, has been scanned by using a handy scanner or the like, when the image display section 17 is directed upwards and the pressure sensors 18a are sequentially turned ON one by one in the long side direction or the short side direction of the image display section 17 in a predetermined order.

Further, it is also applicable that, in addition to the gyro sensor and the pressure sensors, or instead of the gyro sensor and the pressure sensors, a plurality of photo sensors are arranged onto the surface on which the image display section 17 is also mounted, so as to determine that an operation for copying or scanning the image, currently displayed thereon, has been implemented, when the photo sensors sequentially detect lights, each having a predetermined intensity or a wavelength, in a predetermined order.

In this connection, the scope of the configuration of the electronic paper 10 is not limited to that of the abovementioned embodiment shown in FIG. 1. For instance, although the electronic paper 10 shown in FIG. 1 includes the operating section 15 and the touch panel 16, when the setting operations for modifying the image are conducted by operating the computer apparatus or the MFP (Multi-Functional Peripheral) owned by the user concerned, the operating section 15 and the touch panel 16 can be omitted. Further, although the present embodiment is so constituted that the pressure sensors 18a detect the action for pressing the image display section 17, it is also applicable that the touch panel 16 detects the pressing or touching action so as to determine such a state that the image display section 17 is placed onto a certain object or such another state that a handy scanner or the like contacts the image display section 17.

Next, referring to the flowchart shown in FIG. 4, the operations to be implemented in the electronic paper 10, constituted as aforementioned, will be detailed in the following. In the following explanations, it is assumed that the image modification setting information, corresponding to the document image, is stored in advance. Further, it is also assumed that the copying or scanning operation is performed in such a state that the image display section 17 is directed downwards and is placed onto a certain platform.

Initially, according to the inputting operations conducted by the user from the operating section 15 and/or the touch panel 16, the control section 20 (or the display controlling section 24 thereof) makes the image display section 17 display a document image, thereon (Step S101). Successively, the display controlling section 24 identifies a kind of document image, currently displayed and retained onto the image display section 17 (Step S102), so as to confirm the image modification setting information corresponding to the above-identified kind of document image (Step S103). Then, based on the image modification setting information concerned, the display controlling section 24 determines whether or not the document image, currently displayed and retained onto the image display section 17, should be modified (Step S104). When determining that the document image should not be modified (Step S104; No), the display controlling section 24 maintains displaying the document image as the normal displaying operation (Step S105), while, when determining that the document image should be modified (Step S104; Yes), the display controlling section 24 writes the image modification setting information, corresponding to the document image concerned, into the RAM 13, etc., (Step S106).

Successively, based on the signal outputted by the gyro sensor, the status detecting section 22 determines whether or not the image display section 17 of the electronic paper 10 is directed approximately downwards (Step S107). When determining that the image display section 17 is not directed downwards (Step S107; No), the display controlling section 24 maintains the normal displaying operation as it is (Step S105), since the copying or scanning operation cannot be implemented in this state, and accordingly, it is unnecessary to modify the document image concerned. On the other hand, when determining that the image display section 17 is directed downwards (Step S107; No), the status detecting section 22 further determines whether or not the surface of the image display section 17 of the electronic paper 10 is placed onto a certain object, based on the signals outputted by the pressure sensors 18a (Step S108), since the copying or scanning operation is possibly implemented in this state.

Still successively, when determining that the surface of the image display section 17 of the electronic paper 10 is not placed onto a certain object, the display controlling section 24 maintains the normal displaying operation as it is (Step S105), since the copying or scanning operation cannot be implemented in this state, and accordingly, it is unnecessary to modify the document image concerned. On the other hand, when the display controlling section 24 determines that the surface of the image display section 17 of the electronic paper 10 is placed onto a certain object, the counting section 23 adds numeral "1" to the number of copies, and determines whether or not the updated number of copies is equal to or lower than the predetermined number established in advance (Step S109).

Yet successively, when the counting section 23 determines that the updated number of copies is equal to or lower than the predetermined number, the display controlling section 24 reads out the image modification setting information stored in the RAM 13, therefrom. Then, based on the image modification setting information concerned, the display controlling section 24 adds specific information (copy checking woven pattern), clearly indicating that the concerned image is a copy, to the document image currently displayed and retained onto the image display section 17 (Step S110), so as to make the image display section 17 display the document image added with the specific information, thereon (Step S111). Further, the image data, representing the document image added with the specific information, is employed for printing the image onto a paper medium, is stored as scanned data, or is transferred to a computer apparatus of the user. On the other hand, when the counting section 23 determines that the updated number of copies exceeds the predetermined number, the display controlling section 24 erases the document image currently displayed and retained onto the image display section 17 (Step S112).

As aforementioned, according to the present invention, when the number of copies is equal to or lower than the predetermined number in such a state that the electronic paper 10 is directed downwards and the surface of the image display section 17 is placed onto a certain object, the specific information, clearly indicating that the printed image is a copy, is added to the document image, while, when the number of copies exceeds the predetermined number, the document image, currently displayed on the image display section 17, is erased. Accordingly, it becomes possible to appropriately allow the operation for copying the document image, while suppressing the leakage of the information concerned.

In this connection, although the electronic paper 10, exemplified as the aforementioned embodiment, is so constituted that, when the electronic paper 10 fulfills certain specific conditions, the specific information is added to the document image or the document image is erased, it is also applicable that, since then, when the electronic paper 10 has not fulfilled certain specific conditions (for instance, when the image display section 17 of the electronic paper 10 has been directed upwards), the original displaying status is made to resume (for instance, erasing the specific image added to the document image, displaying the document image again, so on), or the modified status is still maintained.

Next, the operation for establishing the image modification will be detailed in the following. FIG. 5 shows a schematic diagram indicating an image modification setting screen 30 to be displayed for every document by the image modifying setting section 21 (or a computer apparatus or an MFP of the user).

The image modification setting screen 30 allows user to establish a presence or absence of the image modification processing, therefrom. When the presence of the image modification processing established, it is possible for the user to establish what kind specific information (characters, symbols, etc.) should be selected and how to arrange the selected specific information. Further, by setting construction items, it is possible to adjust an appearance of the specific information displayed, and it is also possible to confirm how the specific information is displayed under the conditions established. Still further, it is possible to establish a number of copies to be allowed. In this connection, with respect to the document for which no image modification setting is established, the default setting is applied to the document concerned, so that character strings of "COPY" are added onto the document image and the document image added with the character strings of "COPY" are displayed thereon, as shown in FIG. 7. Each of the items will be detailed in the following.

(1) Designation of Setting Document

By inputting letters directly into an input column, or by depressing a reference button to select, it is possible for the user to designate a kind of document to which the image modification processing is to be applied (such as a specific kind of document, a document having a specific name, etc.). In addition, with respect to the document above-designated, the contents of the setting items, indicated in the following, are made to be effective.

(2) Presence or Absence of Image Modification

In the case that the presence of image modification is established (namely, the image modification processing is turned ON), when the number of copies is equal to or lower than the predetermined number in such a state that the image display section 17 of the electronic paper 10 is directed approximately downwards and is placed onto a certain object, the image modification processing for adding the specific information to the document image is implemented, while, when the number of copies exceeds the predetermined number in such a state that the image display section 17 of the electronic paper 10 is directed approximately downwards and is placed onto a certain object, the other image modification processing for erasing the document image concerned is implemented. On the other hand, in the case that the absence of image modification is established (namely, the image modification processing is turned OFF), the normal displaying operation for displaying the document image concerned, as it is, without applying any image modification processing thereto, is implemented.

(3) Establishment of Character

It can be established what kind of character or symbol is to be added to the document image at the time when the image modification processing is turned ON, by inputting it directly into the inputting column. In addition, it is also possible to determine the format and/or the size of the character or the symbol to be inputted.

(4) Establishment of Character Arrangement

It can be established how to arrange the character or the symbol to be added at the time when the image modification processing is turned ON, by depressing the reference button to designate a desired pattern among various kinds of patterns established in advance.

(5) Establishment of Overall Contrast

The overall contrast can be established by sliding the predetermined mark on the line, so as to adjust the electric current flowing time only for pixels included in the specific information to be added, based on the established value of the contrast. For instance, in the case of employing the black and white electronic particles, when the contrast is set at a low value, the color of the specific information appears as a gray color as shown in FIG. 7. Accordingly, it is possible to adjust the appearance of the specific information.

(6) Display of Image Sample

According to the conditions established in setting items (3)-(5) abovementioned, a sample of the synthesized image, created by adding the specific information to the document image, is displayed onto the image display section 17.

(7) Designation of Number of Copy Allowance Times

The user can designate a desired number of copy allowance times by selecting a specific one from plural numbers established in advance, so that, when the number of copies, actually implemented, is equal to or lower than the desired number of copy allowance times designated by the user concerned, the specific information is added to the document image concerned, according to the conditions established in setting items (3)-(5), while, when the number of copies exceeds the desired number of copy allowance times, the document image concerned is erased irrespective of the contents of the setting items (3)-(5).

Since the image modification setting screen 30 represents merely one of various kinds of examples thereof, the scope of the items, being settable by the user, is not limited to those included in the image modification setting screen 30. For instance, as a result of superimposing the specific information onto the document image, sometimes, it becomes impossible for the viewer to clearly recognize (view) the contents of the document image. On the other hand, when the specific information and the document image are arranged in such a manner that both of them do not overlap with each other in order to avoid the abovementioned inconvenience, sometimes, it becomes possible to get rid of only the specific information from the combined image, resulting in inability of preventing the leakage of the information included in the document image concerned. To cope with the abovementioned case, the image modification setting screen 30 may be so constituted that the user can designate a place onto which the specific information is to be added (whether or not the specific information overlaps with the document image).

In that case, the display controlling section 24 parses the construction of the document image by using header information attached to the image data representing the document image, tag bit information attached to the image data representing the document image, etc. Then, as shown in FIG. 8, in order to make it easy to visually recognize the contents of the document image, it may be possible to add the specific information to a partial area in which density of the document image is low, or a background area in which the specific information do not overlap with each of objective images included in the document image. Further, as shown in FIG. 9, in order to prevent the leakage of the information, it may be possible to make at least one set of the specific information overlap with each of the objective images included in the document image.

In this connection, the scope of the present invention is not limited to the embodiment aforementioned. Modifications and additions made by a skilled person without departing from the spirit and scope of the invention shall be included in the scope of the present invention.

For instance, although the aforementioned embodiment has been described on the premise that the display surface of the electronic paper 10 is formed in a flat plane shape, in some cases, the display surface of the electronic paper 10 would be shaped in a curved surface. In such the case, it is also applicable that, when at least a part of the display surface of the electronic paper 10 enters into a specific state, the electronic paper 10 is controlled to modify the document image. According to this feature, it becomes possible to suppress the inappropriate copy operation, even if the electronic paper 10, which is currently bended, or the end portion of which is currently picked up, is placed onto a certain flat object.

Further, although the electronic paper, having an image retaining property, has been exemplified as the aforementioned embodiment, since the thickness of the display device concerned can be established at an arbitral value, the present invention can be also applied to any one of portable type devices, such as a tablet terminal device, a slate personal computer, etc., as well.

The present invention is available for an electronic paper that is capable of retaining a currently displayed image without requiring any power source, a program to be executed by the electronic paper concerned and a method for controlling an operation for copying an image to be displayed on the electronic paper concerned.

According to at least one of the electronic paper, the copy controlling program and the copy controlling method, each embodied in the present invention, it becomes possible to suppress an inappropriate or unauthorized operation for copying an image currently displayed on the electronic paper.

The is because, detecting the fact that the electronic paper currently enters in the specific status (for instance, representing such a state that the image display section is directed downwards and is placed onto a certain object), the electronic paper (by executing the copy controlling program) adds specific information, clearly indicating that the document image concerned is a copy, to the document image, and allows the user to conduct the copying or scanning operation, when the number of copying operations is equal to or lower than the predetermined number of times. On the other hand, when the number of copying operations exceeds the predetermined number of times, the electronic paper erases the document image currently displayed, and conducts the controlling operations for banning the copying and scanning operations.

Accordingly, unless the number of copying operations exceeds the predetermined number of times, it is possible for the appropriate or authorized user to implement the copying or scanning operation so as to use the document image. Further, since the document image currently displayed and retained on the image display section is erased at the time when the number of copying operations has exceeded the predetermined number of times, it becomes possible to effectively prevent the electronic paper from leaking the information included in the document image.

While the preferred embodiments of the present invention have been described using specific term, such description is for illustrative purpose only, and it is to be understood that changes and variations may be made without departing from the spirit and scope of the appended claims.

What is claimed is:

1. An electronic paper that is provided with an image display section having an image retaining property, comprising:
    a sensor to detect a status of the electronic paper;
    a status detecting section to determine whether or not the electronic paper currently enters into such a specific status that allows a user to perform a copying operation or a scanning operation on the image display section, based on an output signal outputted by the sensor;
    a counting section to count a number of times the electronic paper enters into the specific status, to determine whether or not the number of times exceeds a predetermined number of times established in advance, by comparing the number of times the electronic paper enters into the specific status and the predetermined number of times established in advance; and
    a display controlling section to make the image display section display a document image thereon;
    wherein, when the status detecting section determines that the electronic paper currently enters in the specific status, and when the counting section determines that the number of times the electronic paper has entered into the specific status, is equal to or lower than the predetermined number of times established in advance, the display controlling section adds specific information, indicating that the document image concerned is a copy, to the document image currently displayed on the image display section;
    and wherein, when the status detecting section determines that the electronic paper currently enters in the specific status, and when the counting section determines that the number of times the electronic paper has entered into the specific status, exceeds the predetermined number of times established in advance, the display controlling implements other image processing, different than adding specific information, indicating that the document image concerned is a copy, to the document image currently displayed on the image display section.

2. The electronic paper of claim 1,
wherein, the other image processing comprises erasing the document image currently displayed on the image display section.

3. The electronic paper of claim 1,
wherein at least one of setting items, including a kind of the document image serving as an object to which the specific information is added, a string of characters to be employed as the specific information, an arrangement of the specific information, a display contrast of the specific information, and the predetermined number of times, is settable as an adding condition by the user, and
wherein the display controlling section adds the specific information to the document image, according to the adding condition established by the user.

4. The electronic paper of claim 1,
wherein a gyro sensor and a pressure sensitive sensor, each serving as the sensor, are disposed at positions located on a displaying surface side of the electronic paper; and
wherein the specific status represents such a state that the image display section of the electronic paper is directed downwards and the displaying surface side is pressed onto a certain object.

5. An electronic paper that is provided with an image display section having an image retaining property, comprising:
a sensor to detect a status of the electronic paper;
a status detecting section to determine whether or not the electronic paper currently enters into such a specific status that allows a user to perform a copying operation or a scanning operation on the image display section, based on an output signal outputted by the sensor;
a counting section to count a number of times the electronic paper enters into the specific status, to determine whether or not the number of times exceeds a predetermined number of times established in advance, by comparing the number of times the electronic paper enters into the specific status and the predetermined number of times established in advance; and
a display controlling section to make the image display section display a document image thereon;
wherein, when the status detecting section determines that the electronic paper currently enters in the specific status, and when the counting section determines that the number of times the electronic paper has entered into the specific status, is equal to or lower than the predetermined number of times established in advance, the display controlling section adds specific information, indicating that the document image concerned is a copy, to the document image currently displayed on the image display section;
wherein a gyro sensor and a plurality of pressure sensitive sensors, each serving as the sensor, are disposed at positions located on a displaying surface side of the electronic paper, and
wherein the specific status represents such a state that the image display section of the electronic paper is directed upwards and a certain object is pressed onto the displaying surface side in such a manner that the pressure sensitive sensors are sequentially pressed one by one in a long side direction or a short side direction of the image display section.

6. A nontransitory computer readable storage medium storing a computer executable program to be executed in a display apparatus that is provided with an image display section having an image retaining property, the program being executable by a computer to cause the computer to perform a process comprising:
making the image display section display a document image thereon;
determining whether or not the display apparatus currently enters into such a specific status that allows a user to perform a copying operation or a scanning operation on the image display section, based on an output signal outputted by a sensor disposed in advance;
counting a number of times the display apparatus enters into the specific status, to determine whether or not the number of times exceeds a predetermined number of times established in advance, by comparing the number of times the electronic paper enters into the specific status and the predetermined number of times established in advance;
adding specific information, indicating that the document image concerned is a copy, to the document image currently displayed on the image display section, when it is determined that the display apparatus currently enters in the specific status, and when it is determined that the number of times the display apparatus has entered into the specific status, is equal to or lower than the predetermined number of times; and
implementing other image processing, different than adding specific information, indicating that the document image concerned is a copy, to the document image currently displayed on the image display section, when it is determined that the electronic paper currently enters in the specific status, and the number of times the electronic paper has entered into the specific status, exceeds the predetermined number of times established in advance.

7. The nontransitory computer readable storage medium of claim 6, wherein the other image processing comprises erasing the document image currently displayed on the image display section.

8. The nontransitory computer readable storage medium of claim 6, the process further comprising:
setting at least one of setting items, including a kind of the document image serving as an object to which the specific information is added, a string of characters to be employed as the specific information, an arrangement of the specific information, a display contrast of the specific information, and the predetermined number of times, as an adding condition;
wherein the specific information is added to the document image, according to the adding condition.

9. The nontransitory computer readable storage medium of claim 6,
wherein a gyro sensor and a pressure sensitive sensor, each serving as the sensor, are disposed at positions located on a displaying surface side of the a display apparatus; and
wherein the specific status represents such a state that the image display section of the display apparatus is directed downwards and the displaying surface side is pressed onto a certain object.

10. The nontransitory computer readable storage medium of claim 6,
wherein a gyro sensor and a plurality of pressure sensitive sensors, each serving as the sensor, are disposed at positions located on a displaying surface side of the display apparatus; and
wherein the specific status represents such a state that the image display section of the display apparatus is directed upwards and a certain object is pressed onto the displaying surface side in such a manner that the pressure sensitive sensors are sequentially pressed one by one in a long side direction or a short side direction of the image display section.

11. A copy controlling method, employing an electronic paper that is provided with an image display section having an image retaining property, comprising:

making the image display section display a document image thereon; determining whether or not the electronic paper currently enters into such a specific status that allows a user to perform a copying operation or a scanning operation on the image display section, based on an output signal outputted by a sensor disposed in advance;

a counting a number of times the electronic paper enters into the specific status, to determine whether or not the number of times exceeds a predetermined number of times established in advance, by comparing the number of times the electronic paper enters into the specific status and the predetermined number of times established in advance;

adding specific information, indicating that the document image concerned is a copy, to the document image currently displayed on the image display section, when it is determined that the electronic paper currently enters in the specific status, and when it is determined that the number of times the electronic paper has entered into the specific status, is equal to or lower than the predetermined number of times; and implementing other image processing, different than adding specific information, indicating that the document image concerned is a copy, to the document image currently displayed on the image display section, when it is determined that the electronic paper currently enters in the specific status, and the number of times the electronic paper has entered into the specific status, exceeds the predetermined number of times established in advance.

12. The copy controlling method of claim 11, wherein the other image processing comprises erasing the document image currently displayed on the image display section.

13. The copy controlling method of claim 11, further comprising-setting comprising:

setting at least one of setting items, including a kind of the document image serving as an object to which the specific information is added, a string of characters to be employed as the specific information, an arrangement of the specific information, a display contrast of the specific information, and the predetermined number of times, as an adding condition;

wherein the specific information is added to the document image, according to the adding condition.

14. The copy controlling method of claim 11, wherein a gyro sensor and a pressure sensitive sensor, each serving as the sensor, are disposed at positions located on a displaying surface side of the electronic paper; and wherein the specific status represents such a state that the image display section of the electronic paper is directed downwards and the displaying surface side is pressed onto a certain object.

15. The copy controlling method of claim 11, wherein a gyro sensor and a plurality of pressure sensitive sensors, each serving as the sensor, are disposed at positions located on a displaying surface side of the electronic paper; and wherein the specific status represents such a state that the image display section of the electronic paper is directed upwards and a certain object is pressed onto the displaying surface side in such a manner that the pressure sensitive sensors are sequentially pressed one by one in a long side direction or a short side direction of the image display section.

* * * * *